US006816061B1

(12) United States Patent
Wong

(10) Patent No.: US 6,816,061 B1
(45) Date of Patent: Nov. 9, 2004

(54) COMMUNICATION SYSTEM FOR COMMUNICATING COMMON DATA TO A PLURALITY OF RECEPTION DEVICES

(76) Inventor: Keith K. Wong, 6348 E. Doubletree Ranch Rd., Paradise Valley, AZ (US) 85253

(*) Notice: Subject to any disclaimer, the term of this patent is extended or adjusted under 35 U.S.C. 154(b) by 413 days.

(21) Appl. No.: 09/663,533

(22) Filed: Sep. 15, 2000

(51) Int. Cl.[7] .............................. G08B 5/22; H04Q 7/00

(52) U.S. Cl. .................... 340/7.46; 340/7.59; 340/7.58; 340/7.48; 340/7.55; 340/825.29; 340/7.51; 340/7.52

(58) Field of Search ............................... 340/7.46, 7.59, 340/7.58, 7.48, 7.55, 825.29, 7.51, 7.52, 7.63; 705/5; 345/143, 905, 169, 168, 173; 455/347

(56) References Cited

U.S. PATENT DOCUMENTS

| | | | | | |
|---|---|---|---|---|---|
| 5,043,718 | A | * | 8/1991 | Shimura | 340/7.46 |
| 5,398,022 | A | * | 3/1995 | Lipp | 340/825.44 |
| 5,539,392 | A | * | 7/1996 | Hays et al. | 340/825.44 |
| 5,712,867 | A | * | 1/1998 | Yokev et al. | 375/202 |
| 5,737,688 | A | | 4/1998 | Sakai et al. | 455/31.2 |
| 5,777,560 | A | | 7/1998 | Sakai et al. | 340/825.4 |
| 5,973,612 | A | * | 10/1999 | Deo et al. | 340/825.44 |
| 6,269,249 | B1 | * | 7/2001 | Ochiai | 455/519 |
| 6,418,305 | B1 | * | 7/2002 | Neustein | 455/406 |
| 6,429,771 | B1 | * | 8/2002 | Dorenbosch et al. | 340/7.28 |

* cited by examiner

*Primary Examiner*—Michael Horabik
*Assistant Examiner*—Vernal Brown
(74) *Attorney, Agent, or Firm*—Lowell W. Cresham; Jordan M. Meschkow; Meschkow & Gresham, PLC

(57) ABSTRACT

A communication system (10) uses commercial, mass market paging transmission facilities (16) to deliver messages (18') to a population of reception devices (22). Each reception device (22) includes a display screen (48) at which lines (72) of national and local news and advertising, a banner advertising box (74) and a clock (76) are displayed. Line buttons (54') are aligned with the displayed lines (72). The reception device (22) is configured so that a user may press a line button (54') aligned with a particular line (72) scrolling on the display screen (48) to view additional details related to the subject matter of the particular line (72). Selected lines (72) include alert activating codes (42) which signal the reception device (22), when enabled, to activate an alert which attracts the user's attention to those selected lines (72).

15 Claims, 6 Drawing Sheets

FIG. 1
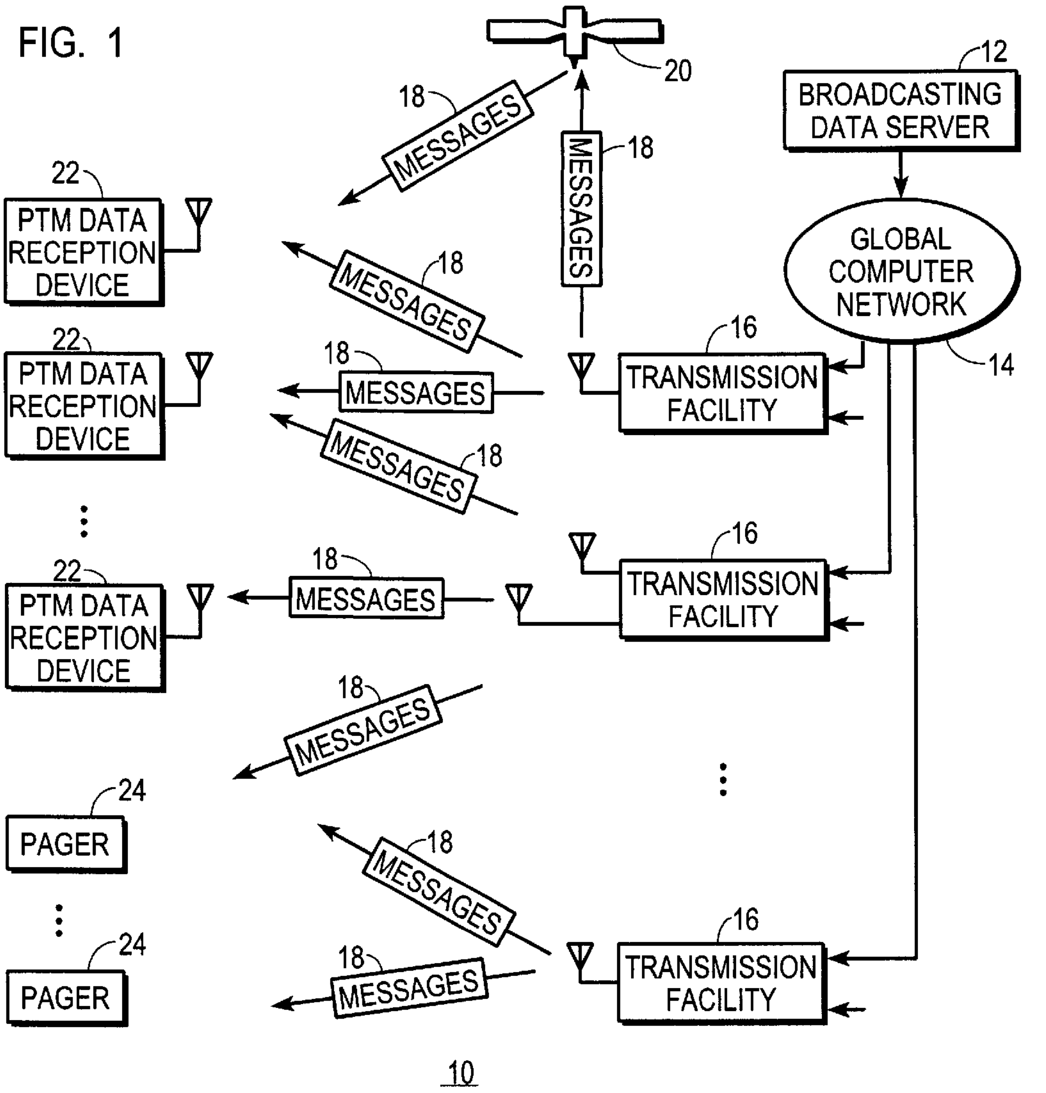
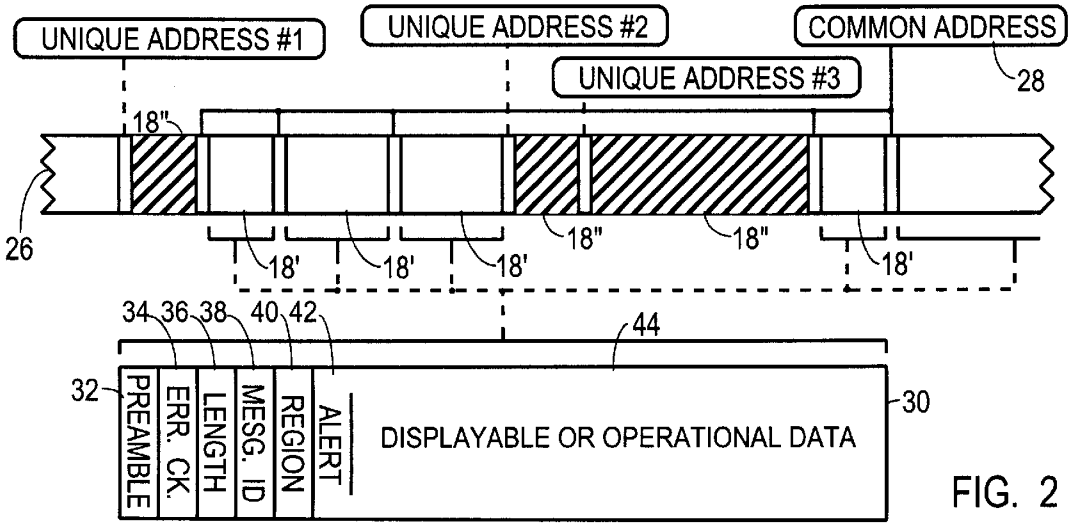
FIG. 2

FIG. 3
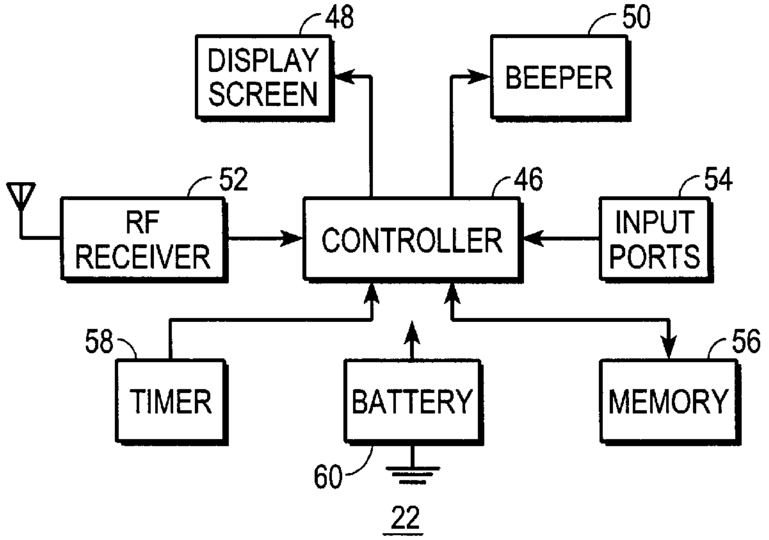
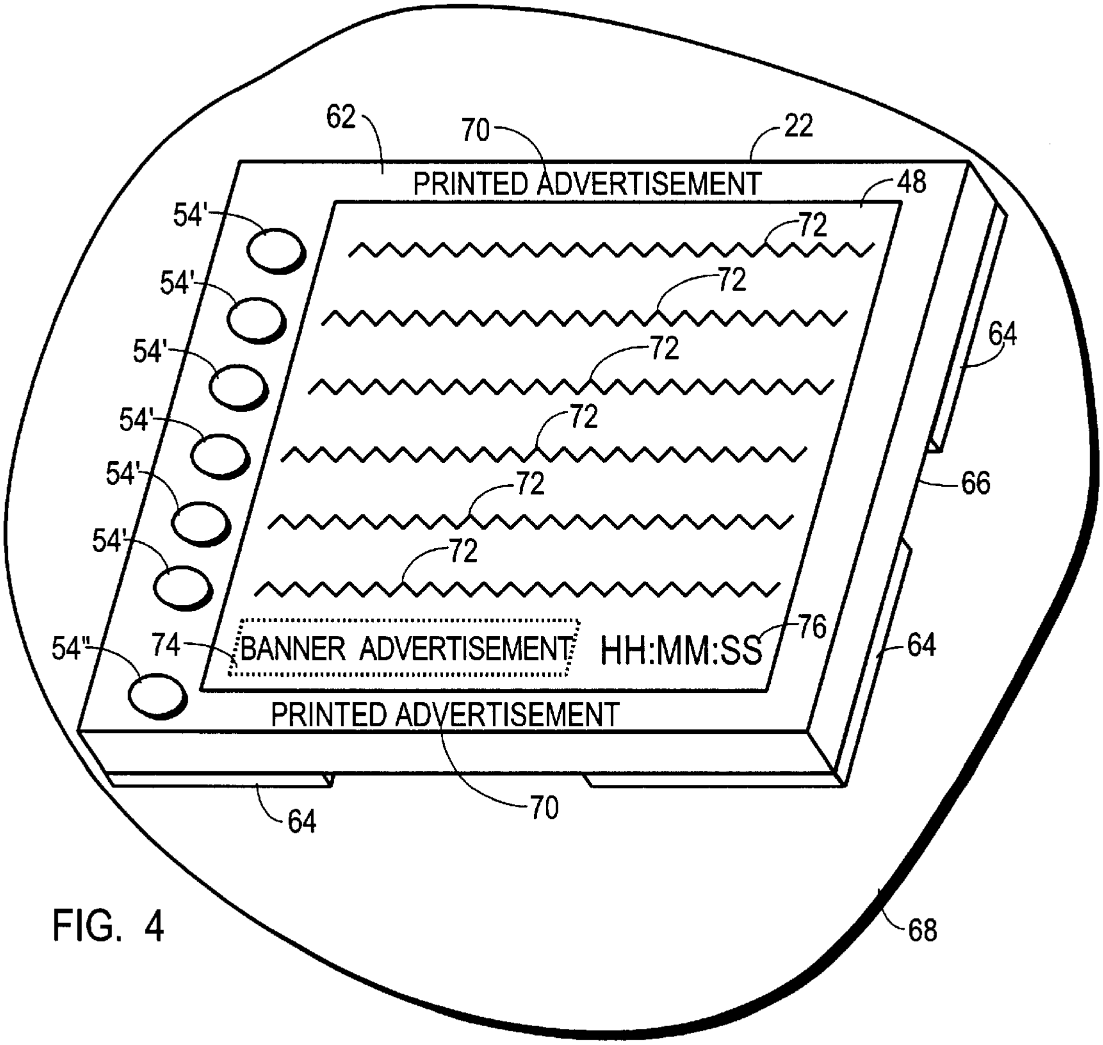
FIG. 4

COMMUNICATION SYSTEM FOR COMMUNICATING COMMON DATA TO A PLURALITY OF RECEPTION DEVICES

TECHNICAL FIELD OF THE INVENTION

The present invention relates to the field of radio communication systems. More specifically the present invention is concerned with point-to-multipoint communication systems which broadcast data and with reception devices which receive the data and present the data for visual user perception while requiring little user involvement.

BACKGROUND OF THE INVENTION

Many electronic devices including pagers, cell phones, portable phones, palm-top computers, lap-top computers, personal computers, televisions, and the like, can be configured to receive a moderate amount of data and present the data for visual user perception. However, these devices are designed primarily to achieve other goals and consequently achieve undesirable results when used to receive a moderate amount of data and present the data for visual user perception.

One problem with conventional electronic reception devices is a requirement for excessive configuration activities before data may be visually perceived by a user. During configuration activities the user obtains or goes to a reception device, turns the device on, tunes the device to a predetermined channel, positions the device so that a display may be viewed, launches a suitable program, or the like. Such configuring activities require an undesirable amount of user involvement for two reasons. First, user involvement beyond simply looking at readily available data from where a user happens to be located, represents a distraction from other routine everyday activities in which the user may be engaged. Second, electronic devices which require an undesirable amount of user involvement require a user to first recognize a need for the data, then require the user to configure the device so that the data may be viewed. Paradoxically, users often fail to recognize the need without first receiving some suggestion about the nature of the data. Hence, users routinely fail to perform the configuring activities needed prior to being able to view data a user would be interested in viewing.

Another problem with conventional electronic reception devices is the excessive cost. Costs often include two components: costs for hardware and costs for services associated with delivering programming content. Less expensive examples of conventional electronic devices, such as pagers and cell phones, tend to have small display screens suitable for portable paging and cell phone purposes where smaller is better, but too small for delivering a useful amount of other types of data, such as news. While pagers and paging services have been configured to deliver news snippets, the amount of news has been too small to be useful, and far too small to additionally deliver advertisements which might have served to defray some of the excessive costs. More expensive examples of conventional electronic devices, such as palm-top, lap-top, and personal computers have excessive hardware costs necessitated to achieve other goals than receiving a moderate amount of data and presenting the data for visual user perception. Once a population of conventional communication devices, such as pagers and cell phones, has been installed, then service costs are often held artificially high due to difficulties in changing delivery systems capable of transmitting programming content in a manner compatible with the installed base of devices.

Yet another problem with conventional electronic reception devices is related to keys or push buttons. In particular, some portable devices, such as pagers, tend to have an undesirably limited number of keys. Having only a few keys is desirable on a portable device because having fewer keys lessens the likelihood that keys will be inadvertently pushed during the jostling typically experienced by portable devices. On the other hand, having only a few keys makes manipulating and navigating through data presented on a display more difficult. Other portable devices, such as cell phones, tend to have more keys, but the keys are configured more to meet conventional telephony traditions than to set forth a relationship with displayed data. Consequently, using the keys to manipulate and navigate through displayed data is difficult. Moreover, if a portable device has more keys, then key locking features are typically implemented to reduce the likelihood of inadvertent key activation. Such key locking features must be negotiated by a user prior to manipulating the keys, thereby forcing even more user involvement before the device can provide a useful service for the user.

Yet another problem with conventional electronic reception devices is that they are often undesirably large and use magnetic storage. Such devices, while not necessarily suffering the problems of portable devices, are too large and expensive to be indefinitely mounted on a refrigerator, file cabinet, wall, or the like in a position where they may be easily viewed by users engaged in routine everyday activities. Even if a user were wanting to so-mount such a device, the use of magnets for convenient mounting on an upright surface is often prevented by incompatibilities between such magnets and the magnetic storage.

SUMMARY OF THE INVENTION

Accordingly, it is an advantage of the present-invention that an improved communication system for communicating common data to a plurality of reception devices is provided.

Another advantage is that a moderate amount of information is transmitted and displayed with a reduced amount of user involvement.

Another advantage is that data in the form of news, advertising and a clock is presented at a location where users engage in routine everyday activities.

Yet another advantage is that established competitive mass market delivery systems can be used to deliver programming content to reception devices at low cost.

Still another advantage is that a moderate amount of data may be provided to a user at little or no cost, with the majority of hardware and programming content and delivery costs being defrayed by advertising.

The above and other advantages of the present invention are carried out in one form by a point-to-multipoint reception device which receives displayable data and time-of-day data from a broadcasting data server. The device includes a radio frequency receiver which receives the displayable data and the time-of-day data from the broadcasting data server. A display screen is provided for displaying the displayable data and a clock. The displayable data is arranged in lines displayed horizontally and the clock is synchronized to the time-of-day data. A plurality of input ports are used to manipulate the lines displayed horizontally on the display screen. The input ports are vertically arranged adjacent to the display screen, and the lines are aligned with the input ports.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a block diagram of a communication system configured in accordance with a preferred embodiment of the present invention;

FIG. 2 shows a data format diagram depicting a transmission protocol used to convey data in the communication system of FIG. 1;

FIG. 3 shows a block diagram of a radio frequency reception device used to receive data conveyed in the communication system of FIG. 1;

FIG. 4 shows a perspective view of one physical embodiment of the reception device;

FIG. 8 shows a flow chart of an operate display process performed by the reception device depicted in FIGS. 3 and 4; and.

DETAILED DESCRIPTION OF THE PREFERRED EMBODIMENTS

Figure 5:
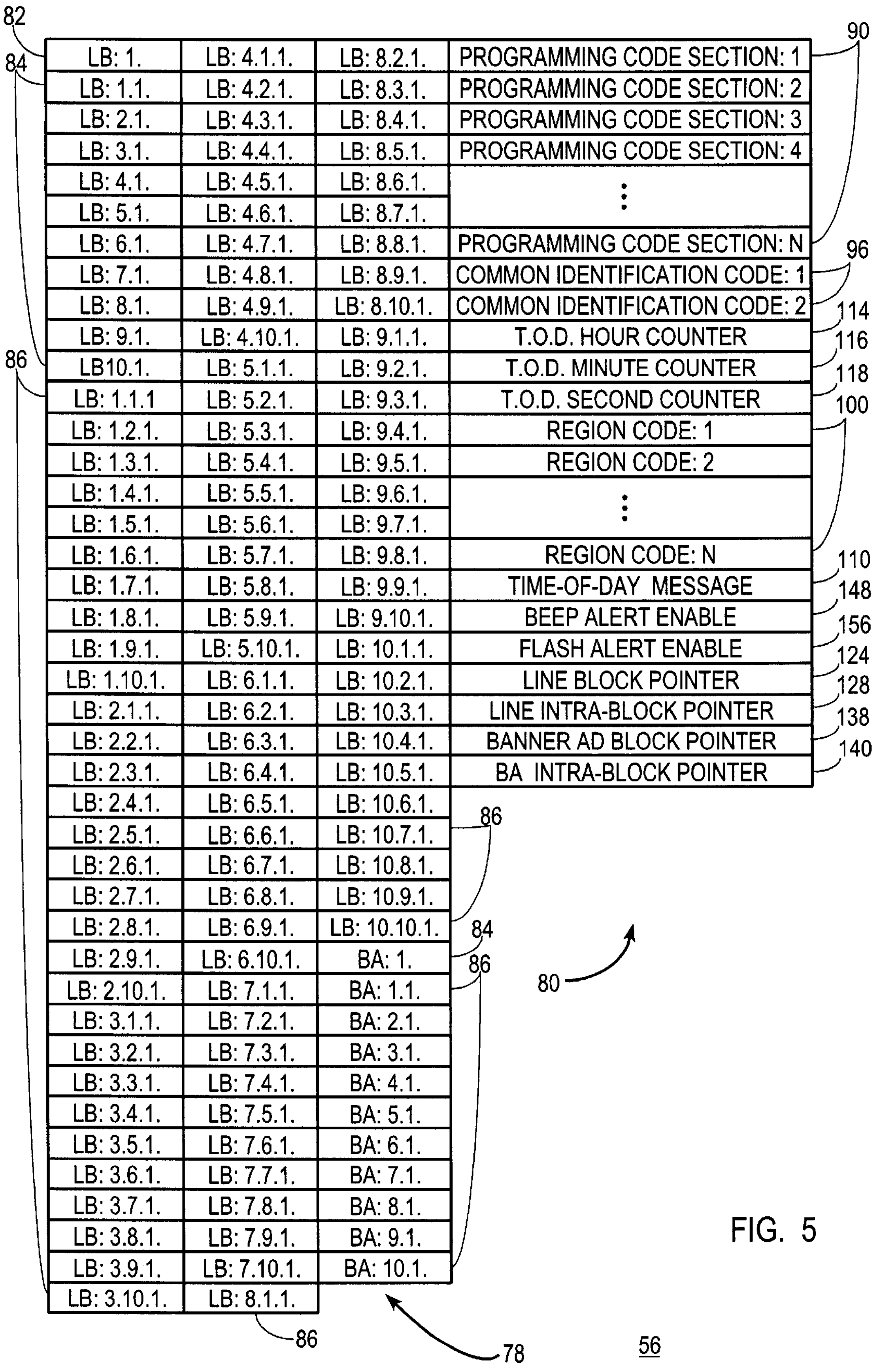
FIG. 5 shows a block diagram of various exemplary blocks of data included in a memory portion of the reception device depicted in FIGS. 3 and 4.

FIG. 1 shows a block diagram of a communication system 10 configured in accordance with a preferred embodiment of the present invention. Communication system 10 includes a broadcasting data server 12 configured as a general purpose or personal computer which has access to programming content to be communicated using communication system 10. Broadcasting data server 12 couples through a global computer network 14, such as the Internet, or through any other convenient communication path to any number of transmission facilities 16. Thus, the programming content is provided to transmission facilities 16 from broadcasting data server 12, where it is transmitted by radio frequency (RF) communication in the form of messages 18.

In the preferred embodiment, conventional mass market commercial paging facilities serve as transmission facilities 16. These facilities may have a local scope, a national scope, and/or include satellites 20 to relay messages 18 over long distances. The terms "national" and "local" are used herein as relative terms to denote geographical regions which are larger and smaller, respectively. No particular geopolitical limitations are implied.

In using conventional mass market commercial paging facilities, messages 18 transmitted from transmission facilities 16 include programming content originating from broadcasting data server 12 and intended for point-to-multipoint (PTM) data reception devices 22 along with conventional page messages intended for conventional pagers 24. Any number, preferably a multiplicity, and more preferably as large of a multiplicity as possible, of reception devices 22 are distributed to users for their use in communication system 10. Of course, the population of conventional pagers 24 includes millions nation wide. The use of conventional mass market commercial paging facilities allows for reliable and inexpensive delivery of messages 18 due to a well-established transmission infrastructure and a competitive marketplace.

In accordance with the preferred embodiment, messages 18 are unidirectional from transmission facilities 16 to reception devices 22. Unlike conventional page messages which tend to be uniquely addressed to individual recipients, large numbers of reception devices 22 receive the same common data.

FIG. 2 shows a data format diagram depicting a transmission protocol 26 used to convey data in communication system 10. In accordance with protocol 26, messages 18 include addresses or identification codes and payload data. Common messages 18', which are directed to the population of reception devices 22 (FIG. 1), share the same common address or identification code 28. Identification code 28 is considered a common address because any number of reception devices 22 are programmed to respond to common messages 18'. However, reception devices 22 are desirably programmed to respond to any of a few identification codes 28 so that one of the few identification codes may be assigned to all reception devices 22, and others of the few identification codes 28 may be assigned to different groups of reception devices 22. In one embodiment, an identification code 28 common to all reception devices 22 is used to deliver national news and advertising while an identification code 28 common only to the reception devices 22 in a local region is used to deliver local news and advertising.

Paging messages 18" are illustrated in FIG. 2 as having a shaded payload section. Paging messages 18" have unique addresses. In accordance with transmission protocol 26, common messages 18' are mixed with paging messages 18" in any manner convenient for transmission facilities 16 (FIG. 1).

A payload section 30 of common messages 18' conveys data which is meaningful within the population of reception devices 22 and generally not meaningful to pagers 24. Common payload section 30 may include a preamble 32 which signifies the beginning of the payload message, an error check (ERR. CK.) code 34 which is used by reception devices 22 to estimate whether messages 18' have errors and should be ignored, a length section 36 which indicates the length of payload section 30, a message identification (MESG. ID) section 38 which informs reception devices 22 of the precise item of data being received, a region code 40 which may be used to filter local news and advertisements in one embodiment of the present invention, an alert activating code 42 which may be used to flag a particular degree of importance to be associated with the common message 18', and displayable or operational data 44 which is stored in a memory section of reception device 22 and responded to as discussed below.

FIG. 3 shows a block diagram of reception device 22, and FIG. 4 shows a perspective view of one physical embodiment of reception device 22. Referring to FIGS. 3–4, a controller 46, preferably embodied as a microprocessor, microcontroller, or the like, couples to a display screen 48, an audible piezoelectric buzzer or beeper 50, an RF receiver 52, input ports 54, a semiconductor memory 56, and a timer 58. A battery 60 or other stand-alone, non-networked energy source supplies the energy needs of reception device 22 so that no electrical cords are plugged into power distribution network outlets and so that reception device 22 may be conveniently mounted in a multitude of locations where users engage in routine everyday activities but where coupling to power outlets might be inconvenient. Desirably, all components of reception device 22 consume only miniscule amounts of power to extend the operational life of battery 60. For example, display screen 48 is desirably a liquid crystal display (LCD), and semiconductor components are desirable manufactured using a complimentary metal oxide semiconductor (CMOS) or other process for manufacturing low power components.

Input ports 54 are preferably embodied as pushbutton keys and positioned to serve as either line buttons 54' or a control button 54". Display screen 48 and input ports 54 are positioned on a face 62 of reception device 22, whereas magnets 64 are positioned on a back 66 of reception device 22. Back 66 opposes face 62. Desirably, magnetic media memory is omitted from reception device 22, and magnets 64 do not endanger data stored in memory 56. Magnets 64 are convenient for attaching reception device 22 at a desired location on a ferrous surface 68, such as a refrigerator door or file cabinet. Forces applied to reception device 22 when depressing input ports 54 tend to cause magnets 64 to clamp more tightly to surface 68 and therefore not displace reception device 22 from its desired location on surface 68.

Thus, reception device 22 may be usable as a refrigerator magnet, but this is not a requirement. In alternate embodiments, other techniques may be used for mounting reception device 22. Desirably, reception device 22 is sufficiently small, lightweight and inexpensive so that it can be mounted in the types of places where clocks and calendars are typically mounted. When so mounted, reception devices 22 may be readily viewed by users engaged in normal daily activities without requiring undesirable amounts of user involvement.

Face 62 of reception device 22 desirably supports printed advertisements 70, which may be applied using a silk screening process or in any other convenient manner. Printed advertisements 70 may be paid for by a business or other institution rather than the user to help defray the costs of reception device 22 and the services required to deliver data thereto. In one embodiment, reception devices 22 are provided free of charge to the user by a business whose advertisements 70 are printed on face 62.

Reception device 22 is configured, as discussed in more detail below, so that displayable and operational data received in common messages 18' (FIG. 2) are displayed in lines 72, in a banner advertisement box 74, and in a clock 76. Lines 72 are configured to horizontally display graphic and alphanumeric data. Those skilled in the art will appreciate that such a horizontal presentation is consistent with a traditional left-to-right direction for reading in many cultures, but that no particular orientation of reception device 22 is mandated. Line buttons 54' are vertically aligned, relative to the horizontal presentation of lines 72, adjacent to display screen 48, and lines 72 are formatted so as to be aligned with line buttons 54'. Thus, a clear physical association is provided between each line button 54' and a particular line 72 of data. As discussed in more detail below, lines 72 automatically scroll. However, banner advertisement box 74 and clock 78 are desirably located in a fixed position on display screen 48.

FIG. 5 shows a block diagram of various exemplary blocks of data stored in memory 56 of reception device 22. In general, this data includes displayable items 78 and operational data 80. In the preferred embodiment, the displayable items 78 that are labeled with an LB prefix (for "line block") include data displayed as lines 72 in display screen 48 (FIG. 4). Some of the LB items convey news and others of the LB items convey advertisements. Some of the LB items which convey news convey national news, and others of the LB items which convey news convey local news. The LB items which convey news, whether national or local, provide information about traditional news subjects including politics, natural and man-made disasters, sports, weather, entertainment, finance, business, government, military, human interest, and the like. The displayable items 78 that are labeled with a BA prefix (for "banner advertisement block") convey advertisements displayed in banner advertisement box 74 of display screen 48 (FIG. 4). Advertisements presented either as scrolling lines 72 or in banner advertisement box 74 are desirably paid for by various business and institutions rather than the user to further help defray the costs of reception device 22 and the services required to deliver data thereto.

FIG. 5 depicts displayable items 78 as blocks of data which have a hierarchical relationship to one another. In the depicted example, a single grandparent LB item 82 is provided, with ten parent LB items 84 subordinate to different lines (not shown) of grandparent item 82, and ten child LB items 86 subordinate to different lines of each parent item 84. Grandparent item 82 is only a parent and child items 86 are only children, but parent items 84 may be viewed as both parent and child because they have child items subordinate to them, and they are subordinate to grandparent items 82. One BA parent item 84 with ten subordinate BA child items 86 is also shown.

Figure 6:
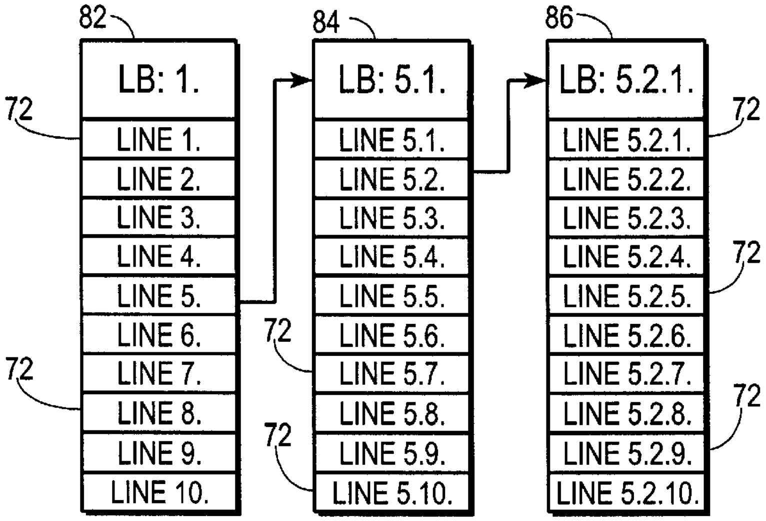
FIG. 6 shows a block diagram of three exemplary blocks of data from FIG. 5 arranged to emphasize a hierarchical relationship.

FIG. 6 shows a block diagram of three exemplary LB items of data in memory 56 from FIG. 5 arranged to emphasize the hierarchical relationship. Those skilled in the art will appreciate that all displayable items, whether LB or BA blocks, may have a similar structure. Each of the LB items 82, 84 and 86 is shown as including ten lines 72 of displayable data. Referring to FIG. 2, in the preferred embodiment each line 72 has been conveyed to reception device 22 in its own single common message 18'. Message ID 38 specifies which line 72 is being conveyed. Alert activation codes 42 may also be associated with each line. As indicated in FIG. 6, child LB item 5.2.1 is subordinate to a line 5.2 of its parent LB item 5.1. Child LB item 5.1 is subordinate to a line 5. of its LB parent item 1.

Referring to FIG. 4, in the preferred embodiment the lines 72 displayed at display screen 48 at any given instant are of a like hierarchical level and from a single LB item. At that instant, a single line from a BA item which corresponds to this single LB item is displayed in banner advertisement box 74. All lines 72 (FIG. 6) stored in memory 56 (FIG. 3) but not being displayed at any given instant are undisplayed or hidden from view by the user. While the majority of lines 72 may be undisplayed or hidden from view at any given instant, they are nevertheless available for instant display because they are retained in memory 56.

Those skilled in the art will appreciate that the example relationships between lines depicted in FIGS. 5–6 are by no means mandatory. Nothing limits the number of LB items or the number of lines 72 associated with any particular LB item. Furthermore, nothing requires all LB and/or BA items to have equivalent numbers of lines 72. Still further, any number of levels may be presented in the hierarchical data structure. Those skilled in the art will further appreciate that this hierarchical data structure is implemented by broadcasting data server 12 (FIG. 1) and is therefore completely flexible and may change as required from day to day.

Figure 7:
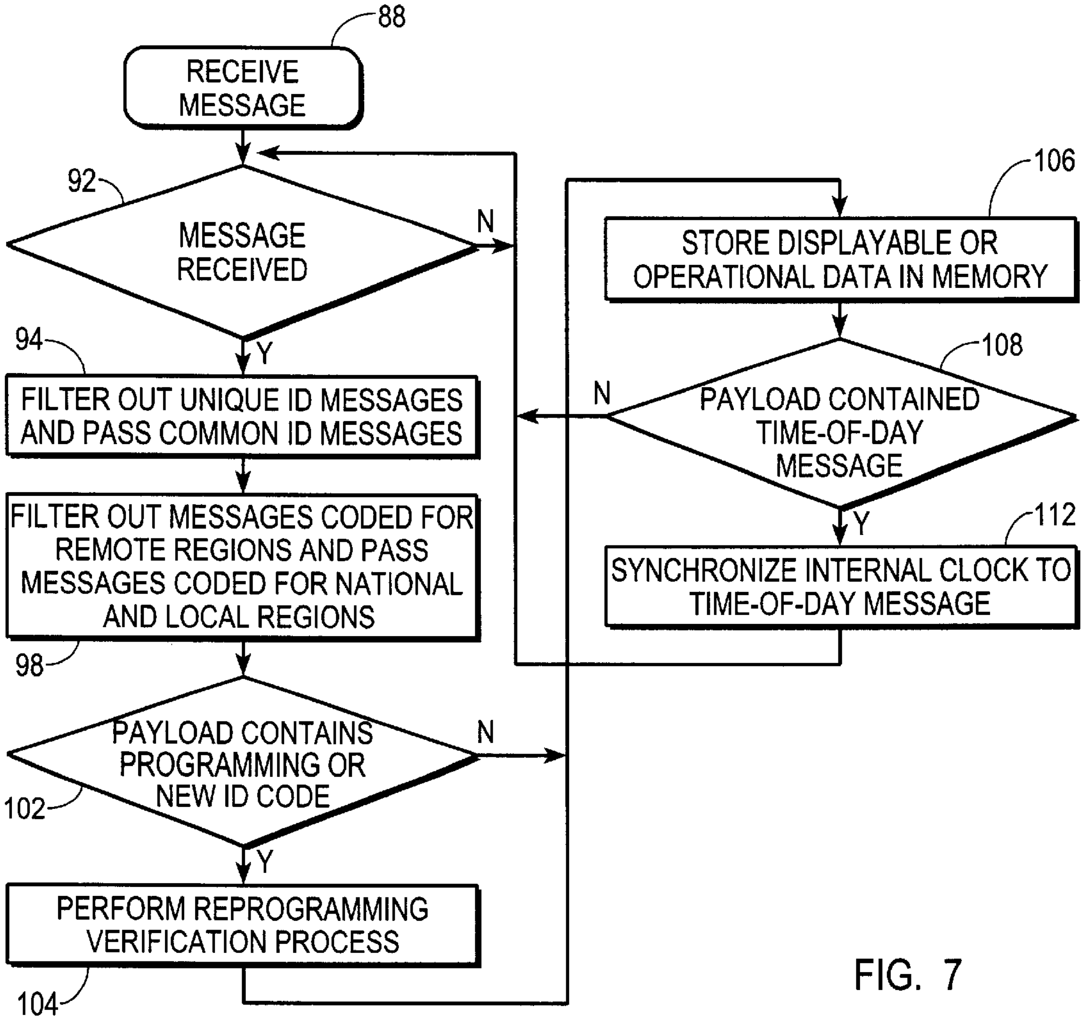
FIG. 7 shows a flow chart of a receive message process performed by the reception device depicted in FIGS. 3 and 4.

FIG. 7 shows a flow chart of a receive message process 88 performed by reception device 22. Process 88 and other processes (discussed below) are carried out in response to the execution by controller 46 (FIG. 3) of a software programming code 90 (FIG. 5) section stored as operational data 80 (FIG. 5) in memory 56 (FIGS. 3 and 5). Those skilled in the art will appreciate that the entire population of reception devices 22 is simultaneously performing similar receive message processes 88. Consequently, large numbers of reception devices 22 are doing the same things at the same time. Receive message process 88 operates in a continuous programming loop which operates simultaneously with other processes (discussed below) that may be ongoing in reception device 22.

Receive message process 88 includes a query task 92. Query task 92 determines whether a message 18 (FIGS. 1–2) has recently been received at RF receiver 52 (FIG. 3). If no message 18 has been received, then program control returns to task 92. Accordingly, process 88 waits at task 92 until a message 18 is detected and then performs a task 94 when the message 18 is detected. Task 94 filters out or otherwise ignores messages 18 addressed to unique ID's (e.g., pagers) and passes messages 18 addressed to common ID's 28 (FIG. 2). Task 94 performs its filtering function by comparing the address of message 18 to common identification codes 96 (FIG. 5) stored in memory 56. Messages 18 for which matches are found are passed onward within process 88.

After task 94, a task 98 filters out messages 18 coded for remote regions and passes messages 18 coded for national and local regions. In one embodiment, local codes are implemented as common identification codes 96 (FIG. 5). In another embodiment, local codes are implemented as region codes 100 (FIG. 5). Region codes 100 may, for convenience, be configured as area codes, zip codes, portions of zip codes, or the like. In either embodiment, task 98 passes messages 18 onward within process 88 if coded by virtue of a common message address 28 (FIG. 2) or a region code 40 (FIG. 2) to indicate either a local or national scope. Messages intended for regions remote to the local region for which reception device 22 has been programmed to operate are ignored. Although not shown in FIG. 7, program control may return to task 92 when tasks 94 or 98 filter out a message 18. Such filtered out messages include page messages 18" (FIG. 2) which are thereby ignored.

Following task 98, process 88 performs a query task 102. At task 102, a message 18' (FIG. 2) which conveys either operational data 80, national news, local news or advertisements has been detected. Task 102 tests for a reprogramming code to determine whether the message 18' contains a programming code section 90 (FIG. 5) or a new common identification code 96 (FIG. 5). If reprogramming is detected, a task 104 performs a reprogramming verification process. Verification of any reprogramming of the addresses to which the population of reception devices 22 responds or of the software programming code which directs the operation of reception devices 22 is desirable to insure that such reprogramming is authorized and authentic. The precise verification process is not critical and may include such features as receiving data to be reprogrammed a multiple times before actually performing any reprogramming, verifying cyclic redundancy or error checking codes (CRC), digital signatures, the reception of subsequent activation codes within predetermined timing windows, and the like.

Reprogramming is a desirable feature because it allows the functionality of and services offered by reception device 22 to be flexible. Moreover, it helps insure that the delivery of messages 18' to the population of reception devices 22 remains competitive and therefore as inexpensive as possible. If a paging service delivering messages 18' fails to offer competitive rates, then the population of reception devices 22 operating on that service may simply be reprogrammed en masse to operate on a different service which offers better delivery rates.

After task 104 verifies reprogramming data or when task 102 determines that the payload of message 18' does not convey reprogramming or new ID code data, process 88 performs a task 106. During task 106 process 88 stores the payload portion of message 18' as either operational data or displayable data in memory 56. This payload portion of message 18' is stored at a location in memory 56 suggested by message ID 38 (FIG. 2) of message 18'. In the preferred embodiment, any alert activating code 42 (FIG. 2) included in a message 18' which conveys a line 72 or 74 of displayable data 78 (FIG. 5) is desirably stored with that displayable data 78.

Following task 106, a query task 108 determines whether the payload portion of message 18' just stored in memory 56 contained time-of-day data 110 (FIG. 5). Time-of-day data 110 may be coded in any form convenient for transmission in a message 18'. If time-of-day data 110 has just been received, a task 112 is performed to synchronize internal clock 76 (FIG. 4) to time-of-day data 110. Desirably, time-of-day data 110 indicates a close approximation to the current time for the instant that task 112 is performed. Task 112 may be performed simply by reformatting time-of-day data 110 into a format suitable for clock 76, such as count values for a time-of-day (TOD) hour counter 114 (FIG. 5), a TOD minute counter 116 (FIG. 5), and a TOD second counter 118 (FIG. 5).

Following task 112 and when task 108 determines that the payload portion of message 18' just stored in memory 56 contained something other than time-of-day data 110, program control loops back to task 92. Program control continues to flow indefinitely within process 88 as discussed herein.

Figure 8:
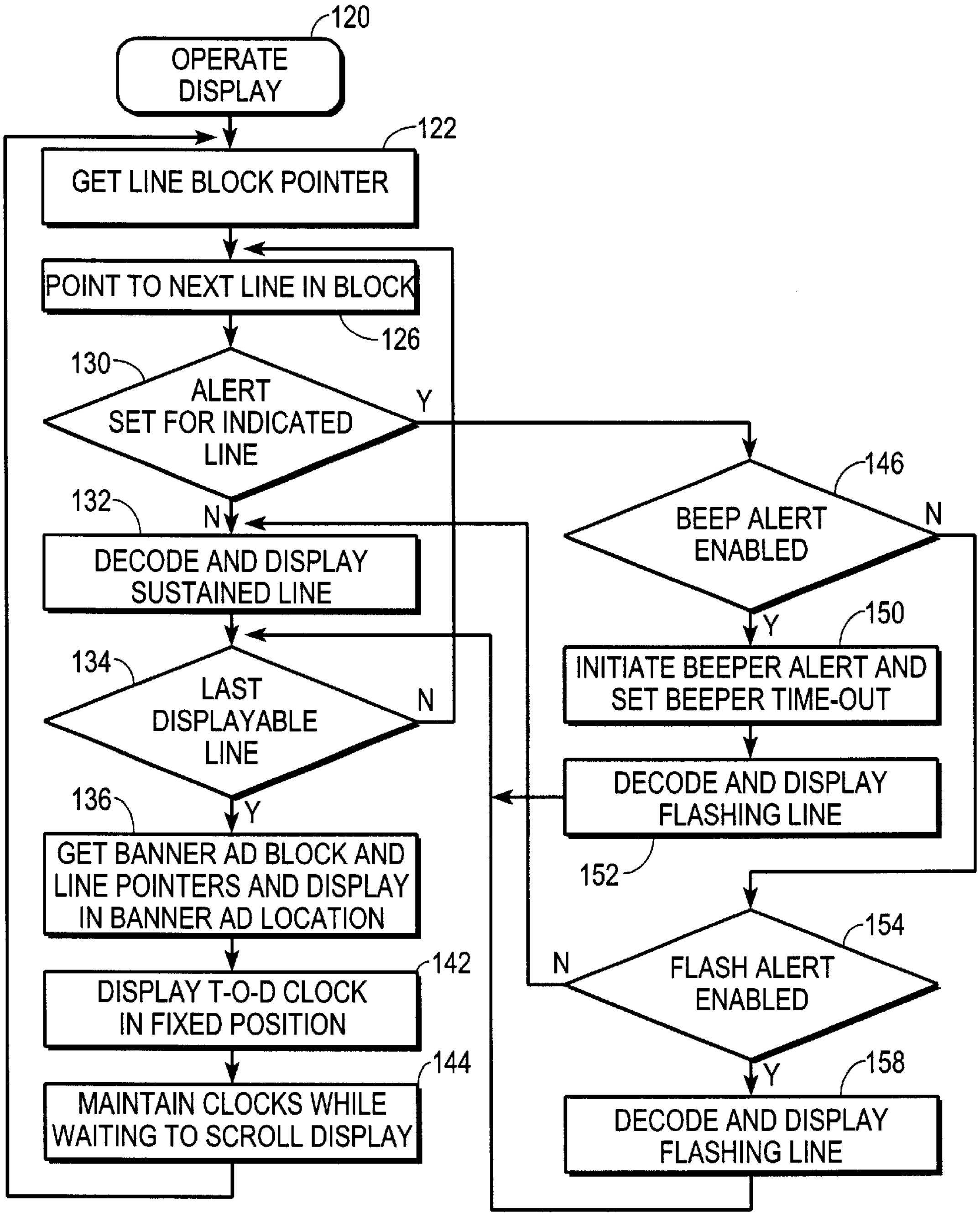

FIG. 8 shows a flow chart of an operate display process 120 performed by reception devices 22. Operate display process 120 operates in a continuous programming loop executed simultaneously with receive message process 88 (FIG. 7). Generally, operate display process 120 causes display screen 48 (FIG. 4) to display certain items of data stored in memory 56. As discussed above, these items of data become stored in memory 56 (FIG. 3) as a result of the operation of receive message process 88.

Process 120 includes a task 122 that gets a line block pointer 124 (FIG. 5) from memory 56. Line block pointer 124 indicates the specific LB item of displayable data 78 from which to select lines 72 for display. Line block pointer 124 is set in accordance with an input port control process discussed below.

After task 122, a task 126 gets an intra-block pointer 128 (FIG. 5) for the current line block. Intra-block pointer 128 points to the next line 72 to display on display screen 48 for the block indicated by block pointer 124. The specific line 72 indicated by pointers 124 and 128 is evaluated next in a query task 130. So long as no alert is set, as indicated by the alert activating code 42 (FIG. 2) for that line 72, program control proceeds to a task 132.

Task 132 decodes the indicated line 72 and displays the line 72 at display screen 48 in a sustained fashion. In the preferred embodiment, displayable data 78 (FIG. 5) may be encoded in any manner which is convenient for transmission and storage purposes. Such an encoding technique may result in data transmitted in messages 18' and/or stored in memory 56 that is unintelligible outside of reception devices 22. Accordingly, task 132 performs any needed decoding so that desired alphanumeric and graphic characters and images are displayed on display screen 48 in the desired line 72. As discussed above, the indicated line 72 is displayed horizontally on display screen 48 at a vertical position which causes the line 72 to be aligned with one of input ports 54 (FIG. 4).

Next, a query task 134 determines whether the last displayable line has been displayed. FIG. 4 illustrates display screen 48 as being capable of displaying six of lines 72 at any given instant. While displaying precisely six lines 72 is not a critical parameter, it is anticipated that only a limited number of lines 72 may be displayed at any given instant due to space limitations of display screen 48 and a desire to make lines 72 easily perceivable and hence as large as possible. Task 134 determines whether the last line 72 (e.g., the sixth) of which display screen 48 is capable has been displayed. So long as this last line has not yet been displayed on display screen 48, program control loops back to task 126 and remains in a programming loop which includes tasks 126, 130, 132 and 134. For each subsequent iteration of task 126, pointer 128 is incremented or decremented, desirably in a modulo fashion limited to the number of lines 72 in the current line block so that different lines 72 are displayed at different positions on display screen 48.

When the last line has been displayed, a task 136 is performed to get banner advertisement block and intra-block line pointers 138 and 140 (FIG. 5), respectively, then decode and display the indicated banner advertisement line in banner advertisement box 74 (FIG. 4). Following task 136, a task 142 displays time-of-day (T-O-D) clock 76 in a fixed position, which FIG. 4 indicates as being beside banner advertisement box 74 in the depicted example. Time-of-day clock 76 may be displayed in response to the contents of T.O.D. hour, minute and second counters 114, 116 and 118 (FIG. 5), respectively, along with appropriate punctuation.

Following task 142, a task 144 maintains clocks while waiting to scroll lines on display 72. The clocks to be maintained include time-of-day clock 76, a time-out timer (discussed below), and any other alarm clocks or timers (not shown) which may be implemented in reception device 22. Such clocks may be maintained by incrementing appropriate counters, such as T.O.D. hour, minute and second counters 114, 116 and 118 (FIG. 5) at the desired rate with the aid of interrupts provided by timer 58 (FIG. 3). If the wait for scrolling is long, task 142 desirably updates clock 76 in display screen 48 to accurately track the passage of time. In the preferred embodiment, program control may wait at task 144 for a duration in the range of 1–30 seconds before proceeding.

When this wait period has expired, program control returns to task 122 to repeat the display process. In a subsequent iteration of task 122, the same block pointer 124 (FIG. 5) used in the previous iteration of task 122 is used again unless it has been altered through the operation of the input port control process (discussed below). However, task 126 starts with an incremented or decremented line pointer 128 (FIG. 5) from the line pointer 128 previously used so that the lines 72 displayed on display screen 48 automatically scroll, and all lines 72 included in the indicated line block are eventually displayed at display screen 48.

At query task 130, process 120 may from time to time encounter a line 72 for which alert activating code 42 (FIG. 2) has been set. The decision of whether or not to set alert activating code 42 is made at broadcasting data server 12 and is a part of the process of deciding which data to include as programming content. Desirably, alert activating code 42 is rarely asserted and is thus equivalent to a news bulletin, but may be associated with advertisements as well. When this scenario is encountered, program control flows from task 130 to a query task 146. Task 146 determines whether a beeping form of alert has been enabled for reception device 22. Task 146 may make its determination by evaluating a beep alert enabling code 148 (FIG. 5) stored in memory 56.

When task 146 finds that beep alert enabling code 148 indicates an enabled status, a task 150 initiates a beeper alert by activating beeper 50 (FIG. 3) and sets a time-out timer for beeper 50. Although not explicitly shown in FIG. 8, when this time-out timer expires, process 120 will automatically deactivate the beeper alert. A desirable duration for this time-out timer may be in the range of 4–10 seconds. Following task 150, a task 152 decodes and displays the indicated line 72 as discussed above in connection with task 132, except that task 152 displays the indicated line 72 in a flashing rather than a sustained manner. Those skilled in the art will appreciate that the beeping and the flashing of line 72 will attract a user's attention to the indicated line 72 in a much more thorough and effective manner than would result without the alert. Following task 152, program control proceeds to task 134, discussed above.

When task 146 finds that beep alert enabling code 148 indicates a disabled status, a query task 154 then determines whether a flashing form of alert has been enabled for reception device 22. Task 154 may make its determination by evaluating a flash alert enabling code 156 (FIG. 5) stored in memory 56. If the flash alert is not enabled, program control proceeds to task 132, discussed above. However, if the flash alert is enabled, a task 158 decodes and displays the indicated line 72 in a flashing manner. Those skilled in the art will appreciate that the flashing of line 72 will attract a user's attention to the indicated line 72 in a more thorough manner than would result without any alert, but in a less thorough and more subtle manner than would occur with the beep alert discussed above. After task 158, program control proceeds to task 134, discussed above.

Figure 9:
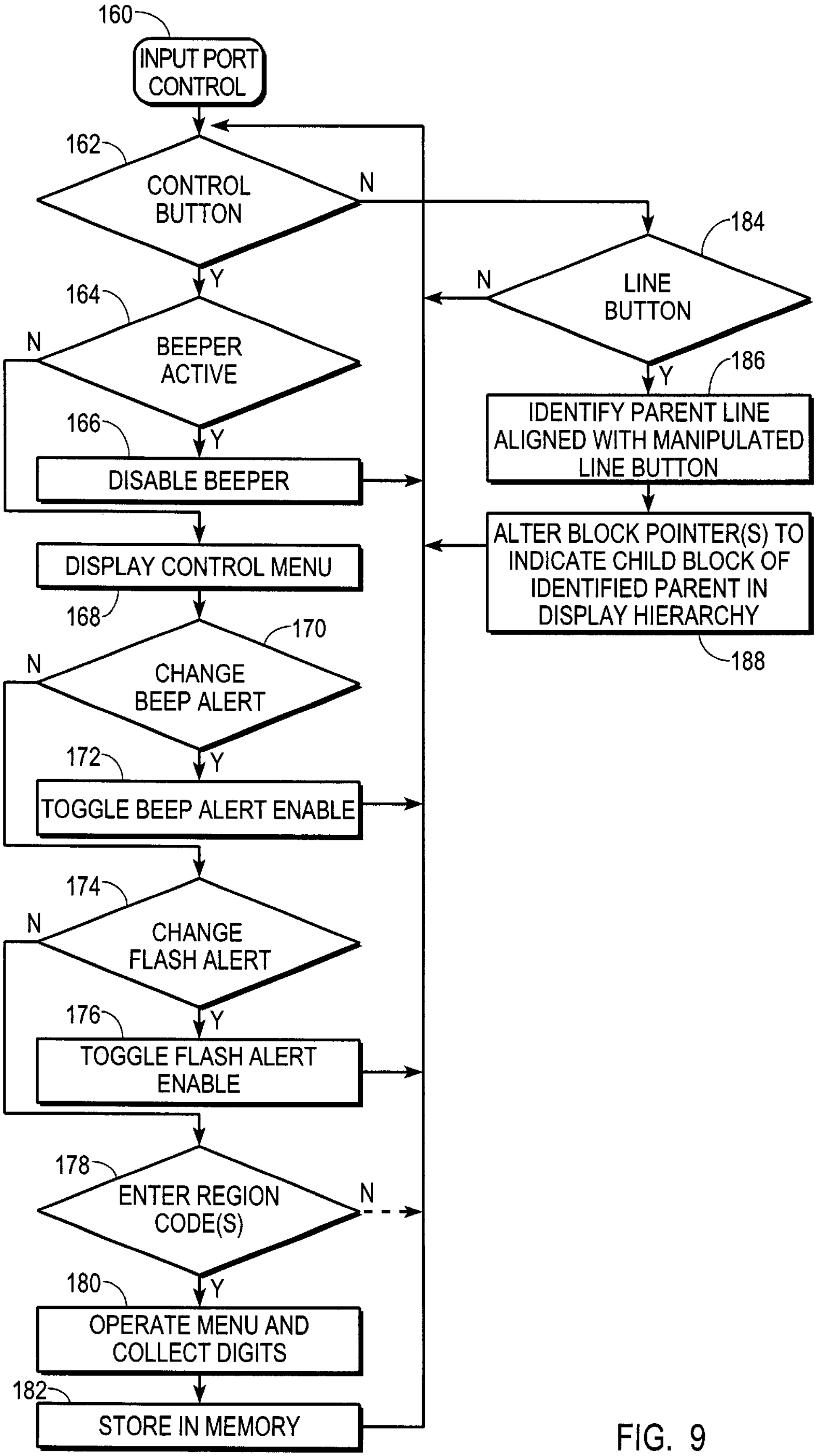
FIG. 9 shows a flow chart of an input port control process performed by the reception device depicted in FIGS. 3 and 4.

FIG. 9 shows a flow chart of an input port control process 160 performed by reception device 22. Input port control process 160 operates in a continuous programming loop executed simultaneously with receive message process 88 (FIG. 7) and operate display process 120 (FIG. 8). Generally, input port control process 160 allows a user to manipulate input ports 54 (FIG. 2) to follow the hierarchical data structure discussed above to alter the data being displayed at display screen 48 (FIG. 4) and personalize the programming of reception device 22.

Process 160 includes a query task 162 which determines whether a user has manipulated control button 54" (FIG. 2). Control button 54" differs from line buttons 54' (FIG. 2) by not being associated with any particular line 72 displayed at display screen 48. If control button 54" activity is detected, then a query task 164 determines if beeper 50 is active. In other words, task 164 determines whether reception device 22 is beeping. If beeper 50 is active, then a task 166 is performed to disable beeper 50, and program control returns to task 162. Accordingly, the audible portion of a beep alert, discussed above in connection with task 150 (FIG. 8), or other beeping may be instantly quenched simply by pressing control button 54".

When task 164 fails to detect beeping activity, a task 168 causes a control menu to be displayed at display screen 48. Different prompts are presented in alignment with different line buttons 54'. The different prompts visually inform the user that the user can enable or disable the beep alert, enable or disable the flash alert, enter region codes, and the like.

Task 168 may also temporarily lock program control in simultaneously executed process 120 at waiting task 144 (FIG. 8) so that control of display screen 48 remains with process 160.

Next, a query task 170 determines whether the user has manipulated the line button 54' which is aligned with the menu prompt indicating an option for changing the beep alert. If this activity at this line button 54' is detected, then a task 172 is performed to toggle the status of beep alert enable code 148 (FIG. 5), and program control returns to task 162. In addition, task 172 may unlock program control in process 120 (FIG. 8) so that the control of display screen 48 transfers back to process 120.

When task 170 fails to detect an input for changing the beep alert, a query task 174 is performed. Task 174 determines whether the user has manipulated the line button 54' which is aligned with the menu prompt indicating an option for changing the flash alert. If this activity at this line button 54' is detected, then a task 176 is performed to toggle the status of flash alert enable code 156 (FIG. 5), and program control returns to task 162. In addition, task 176 may unlock program control in process 120 (FIG. 8) so that the control of display screen 48 transfers back to process 120.

When task 174 fails to detect an input for changing the flash alert, a query task 178 is performed. Task 178 determines whether the user has manipulated the line button 54' which is aligned with the menu prompt indicating an option for entering region codes. If this activity at this line button 54' is detected, then a task 180 is performed to operate or otherwise display a menu which prompts the user to use line buttons 54' to indicate digits, and to collect digits from line buttons 54'. Through such a menu structure, a user may indicate a zip code, area code, state code, or other code which indicates a specific local geographic region within the scope of communication system 10 (FIG. 1).

Following task 180, a task 182 causes those digits collected above in task 180 to be stored at a region code 100 (FIG. 5) in memory 56. Following the entry of a region code 100, messages 18' addressed to a specific local region and conveying local news and local advertising may be responded to by reception device 22. Otherwise, such local news and advertising will be ignored and filtered out by reception device 22 through the operation of tasks 94 and 98 (FIG. 7). Task 182 may also unlock program control in process 120 (FIG. 8) so that the control of display screen 48 transfers back to process 120, then program control returns to task 162.

As suggested by a dotted line exiting task 178 when no indication for entering region codes is identified, program control eventually returns to task 162. However, any number of additional personalization programming features may be implemented. For example, controls may be implemented to specify various optional wait times for scrolling at task 144 in process 120 (FIG. 8). Alarm clock and/or count down timer controls may be implemented. In one embodiment, alert activation code 42 (FIG. 2) may indicate different levels of warning, and controls may be implemented to specify at which warning levels different types of alerts should be activated. These and other control features are included within the scope of the present invention.

Referring back to task 162, when no manipulation of control button 54" is detected, a query task 184 determines whether a line button 54' has been manipulated. When no line button has been manipulated, program returns to task 162. Thus, in the normal mode of operation, display screen 48 is controlled by process 120 (FIG. 8), and process 160 simply loops between tasks 162 and 184. When control button 54" is manipulated, the control of reception device 22 is altered as indicated above.

When a line button 54' is manipulated, a task 186 identifies the line 72 displayed in alignment with the manipulated line button 54'. For the sake of discussion, this line 72 is assumed to be a parent line. Following task 186, a task 188 alters line block pointer 124. Line block pointer 124 is altered to indicate the line block that is a child for the parent line identified above in task 186. As indicated in the example depicted in FIG. 6, if line block pointer 124 indicates LB: 1., and line 5 is aligned with a manipulated line button 54', then line block pointer 124 is changed to indicate LB: 5.1. In concert with altering line block pointer 124, task 188 also desirably alters banner advertisement block pointer 138 to indicate a corresponding banner advertisement block. For the FIG. 6 example, alteration of line block pointer 124 from LB: 1 to LB: 5.1 may be accompanied by alteration of banner advertisement block pointer 138 from BA: 1. to BA: 5.1 (FIG. 5). Following task 188, program control returns to task 162.

As a consequence of performing tasks 186 and 188, process 120 (FIG. 8) then begins to display data of a different hierarchy than previously displayed, and the precise displayed data is determined by identifying the line button 54' manipulated at the instant a particular line 72 was being displayed in alignment therewith. The newly displayed data will be a previously undisplayed item.

Continuing the example of FIG. 6, if the user again manipulates a line button 54', for example the line button 54' aligned with line 5.2, then tasks 186 and 188 will again be performed to cause line block pointer 124 (FIG. 5) to indicate LB: 5.2.1. which is subordinate to block LB: 5.1 at line 5.2.

In operation, broadcasting data server 12 (FIG. 1) provides a stream of messages 18' to transmission facilities 16 (FIG. 1). The stream of messages 18' need not exhibit any regularity or pattern. The messages 18' themselves define their own relationship within a hierarchy and can be arranged as desired to convey local and national advertisements and news. Messages 18' may also convey operational data in the form of a time-of-day signal, new programming, new addresses, and the like. Reception devices 22 receive their local advertisements and news and the national advertisements and news and store these items in memory 56 as lines 72 and as banner advertisements. Users desirably mount their reception devices 22 at convenient locations where they may be readily observed, such as in locations where a clock or calendar might be mounted. Each user's reception device 22 begins to display a block of lines 72. If the user sees a line 72 of interest, the user may press the line button 54' aligned with that line 72 of interest, and a previously undisplayed block of lines 72 will be displayed. The user may see a line 72 of interest simply by observing display screen 48 or by having his or her attention drawn to display screen 48 by an alert. Desirably, this new block of lines 72 is related in subject matter to the previous line of interest 72 so as to provide more information on the subject. Even more information may be provided by again pressing a line button 54' aligned with a line 72 of interest. If the user again presses a line button 54' while reception device 22 is displaying a most subordinate child block of lines 72, then the hierarchy is desirably reset to the most superior parent block of lines 72.

In summary, the present invention provides an improved communication for communicating common data to a plurality of reception devices. A moderate amount of information is transmitted and displayed at a reception device with a reduced amount of user involvement. The reception device is configured to be easily mounted in locations where users engage in routine everyday activities. The displayed data desirably takes the form of news, advertising, and a clock. Competitive mass market delivery systems, such as commercially available paging delivery systems, are used to deliver programming content to the reception devices at low cost, and programming, including reception device addressing, may be reprogrammed as needed to maintain the competitiveness of the delivery system. A moderate amount of data is provided to a user at little or no cost, with the majority of hardware and programming content and delivery costs being defrayed by the delivery of advertising along with news.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A point-to-multipoint reception device which receives displayable data and time-of-day data from a broadcasting data server, said device comprising:

a radio frequency receiver which receives said displayable data and said time-of-day data from said broadcasting data server;

a display screen for displaying said displayable data and a clock, wherein said displayable data is arranged in lines displayed horizontally and said clock is synchronized to said time-of-day data; and a plurality of input ports used to manipulate said lines displayed horizontally on said display screen, wherein said input ports are vertically arranged adjacent to said display screen and said lines are aligned with said input ports.

2. A point-to-multipoint reception device as claimed in claim 1 additionally comprising a memory coupled to said receiver and configured to store said displayable data and said time-of-day data, said memory being further configured to store programming code responsible for controlling said device, and said programming code being remotely programmed by said broadcast data server.

3. A point-to-multipoint reception device as claimed in claim 1 additionally comprising a memory coupled to said receiver and configured to store said displayable data and said time-of-day data, said memory being further configured to store a code which serves as an address of said device so that said device responds to messages addressed to said code and said device ignores messages not addressed to said code, said code being remotely reprogrammed by said broadcast data server.

4. A point-to-multipoint reception device as claimed in claim 1 additionally comprising a magnet opposing said display screen for mounting said device to a metal surface.

5. A point-to-multipoint reception device as claimed in claim 1 wherein said displayable data comprises national and local news.

6. A point-to-multipoint reception device as claimed in claim 1 wherein said displayable data comprises news and advertisements.

7. A point-to-multipoint reception device as claimed in claim 1 wherein:

said displayable data are associated with alert data; and said device is configured to flash and sustain said lines displayed on said display screen in response to said alert data.

8. A point-to-multipoint reception device as claimed in claim 1 wherein:

said device additionally comprises a controller coupled to said display screen, said input ports and said receiver;

said displayable data are configured to exhibit a hierarchical relationship; and said controller is configured to select a portion of said displayable data to display in said lines on said display screen in response to manipulation of said input ports.

9. A point-to-multipoint reception device as claimed in claim 8 wherein:

said lines are manipulated in response to pressing one of said input ports;

said portion of said displayable data displayed on said display screen is selected in response to a previous line displayed on said display screen; and said previous line is identified by being aligned with one of said input ports when said one of said input ports is pushed.

10. A point-to-multipoint reception device as claimed in claim 1 wherein:

said display screen displays only a portion of said displayable data at a single instant; and said display screen scrolls said displayed portion of said displayable data so that said lines displayed horizontally become aligned with different input ports at different instants.

11. A point-to-multipoint reception device as claimed in claim 1 wherein said device is exclusively energized from a stand-alone, non-networked energy source.

12. A point-to-multipoint unidirectional communication system for communicating common data to a plurality of reception devices, said communication system comprising:

a transmission facility for transmitting messages in accordance with a transmission protocol in which said messages are addressed to individual recipients identified by identification codes, said transmission facility being configured to transmit said common data in first ones of said messages addressed to a common identification code and to transmit individual pages in second ones of said messages addressed to unique identification codes; and a plurality of reception devices, wherein each of said reception devices has a display screen and a plurality of input ports, and each of said reception devices is programmed with said common identification code, receives said first and second ones of said messages, filters out said second ones of said messages, stores said common data from said first ones of said messages, and displays at said display screen a portion of said common data selected in response to manipulation of said input ports; wherein said reception devices are configured to display at least a portion of said common data in lines horizontally aligned with said input ports.

13. A communication system as claimed in claim 12 wherein:

said portion of said common data is hierarchically organized into levels of parent items and child items, wherein each child item is subordinate to an associated parent item; and each of said reception devices displays items of a like hierarchical level.

14. A communication system as claimed in claim 13 wherein each reception device replaces items displayed on said display screen with undisplayed items in response to manipulation of one of said input ports, said one of said input ports indicating which undisplayed items to display in replacing said items displayed on said display screen, said undisplayed items being selected from a hierarchical level different from a hierarchical level for said displayed items.

15. A communication system as claimed in claim 12 wherein:

said portion of said common data is a first portion;

said first portion of said common data conveys news; and said reception devices are configured to display a second portion of said common data which conveys advertisements.

* * * * *